United States Patent
Ayyagari et al.

(10) Patent No.: US 8,027,345 B2
(45) Date of Patent: Sep. 27, 2011

(54) METHOD FOR AUTOMATICALLY PROVIDING QUALITY OF SERVICE

(75) Inventors: Deepak Ayyagari, Vancouver, WA (US); Sherman L. Gavette, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 706 days.

(21) Appl. No.: 11/388,584

(22) Filed: Mar. 24, 2006

(65) Prior Publication Data

US 2007/0025243 A1 Feb. 1, 2007

Related U.S. Application Data

(60) Provisional application No. 60/703,381, filed on Jul. 27, 2005.

(51) Int. Cl.
*H04L 12/28* (2006.01)

(52) U.S. Cl. .......... 370/394; 370/216; 370/248

(58) Field of Classification Search .......... 370/465, 370/395.41, 216, 389
See application file for complete search history.

(56) References Cited

U.S. PATENT DOCUMENTS

| | | | |
|---|---|---|---|
| 4,977,593 A | 12/1990 | Ballance | |
| 5,142,578 A | 8/1992 | Matyas et al. | |
| 5,185,796 A | 2/1993 | Wilson | |
| 5,204,903 A | 4/1993 | Okada et al. | |
| 5,887,063 A | 3/1999 | Varadharajan et al. | |
| 5,987,331 A | 11/1999 | Grube et al. | |
| 6,097,817 A | 8/2000 | Bilgic et al. | |
| 6,526,581 B1 | 2/2003 | Edson | |
| 6,559,757 B1 | 5/2003 | Deller et al. | |
| 6,587,453 B1 | 7/2003 | Romans et al. | |
| 6,594,268 B1 * | 7/2003 | Aukia et al. | 370/400 |
| 6,759,946 B2 | 7/2004 | Sahinoglu et al. | |
| 6,775,280 B1 | 8/2004 | Ma et al. | |
| 6,782,476 B1 | 8/2004 | Ishibashi | |
| 6,807,146 B1 | 10/2004 | McFarland | |
| 6,901,064 B2 | 5/2005 | Cain et al. | |
| 6,934,249 B1 * | 8/2005 | Bertin et al. | 370/218 |
| 7,200,147 B2 | 4/2007 | Shin et al. | |
| 7,212,513 B2 | 5/2007 | Gassho et al. | |
| 7,242,932 B2 | 7/2007 | Wheeler et al. | |
| 7,330,457 B2 | 2/2008 | Panwar et al. | |
| 7,342,896 B2 | 3/2008 | Ayyagari | |
| 7,356,010 B2 | 4/2008 | He et al. | |

(Continued)

FOREIGN PATENT DOCUMENTS

EP 0 844 563 B1 1/2003

(Continued)

OTHER PUBLICATIONS

Ayyagari,Deepak,"High Speed Home Networking for AV and IP Applications using existing Powerline Infrastructure,"Dec. 2004,pp. 65-72,paras:[0001]&[0004],Sharp Technical Journal.

David Ruiz et al., "In-Home AV PLC MAC with Neighboring Networks Support," IEEE, 2005, p. 17, rt. hand column, line 14-p. 20,rt. hand column, line 16; and Figs. 2,3,& 6.

(Continued)

*Primary Examiner* — Daniel Wu
*Assistant Examiner* — Frederick Ott
(74) *Attorney, Agent, or Firm* — Michael Blaine Brooks, PC; Michael B. Brooks; David Ripma (57) ABSTRACT

The embodiments of the present invention provide methods, devices, and systems that automatically provide quality of service to one or more packets, typically by determining whether packets are connection-worthy and accordingly providing connection specifications.

20 Claims, 7 Drawing Sheets

U.S. PATENT DOCUMENTS

| | | | |
|---|---|---|---|
| 7,496,078 | B2 | 2/2009 | Rahman |
| 7,506,042 | B2 | 3/2009 | Ayyagari |
| 2001/0048692 | A1 | 12/2001 | Karner |
| 2002/0116342 | A1 | 8/2002 | Hirano et al. |
| 2002/0150249 | A1 | 10/2002 | Ohkita et al. |
| 2002/0163933 | A1 | 11/2002 | Benveniste |
| 2003/0038710 | A1 | 2/2003 | Manis et al. |
| 2003/0039257 | A1 | 2/2003 | Manis et al. |
| 2003/0051146 | A1 | 3/2003 | Ebina et al. |
| 2003/0056014 | A1 | 3/2003 | Verberkt et al. |
| 2003/0066082 | A1 | 4/2003 | Kliger et al. |
| 2003/0198246 | A1 | 10/2003 | Lifshitz et al. |
| 2003/0203716 | A1 | 10/2003 | Takahashi et al. |
| 2003/0231607 | A1 | 12/2003 | Scanlon et al. |
| 2004/0013135 | A1 | 1/2004 | Haddad |
| 2004/0066783 | A1* | 4/2004 | Ayyagari ............... 370/395.3 |
| 2004/0075535 | A1 | 4/2004 | Propp et al. |
| 2004/0077345 | A1* | 4/2004 | Turner et al. .............. 455/423 |
| 2004/0165728 | A1 | 8/2004 | Crane et al. |
| 2004/0174829 | A1 | 9/2004 | Ayyagari |
| 2004/0214570 | A1 | 10/2004 | Zhang et al. |
| 2004/0253996 | A1 | 12/2004 | Chen et al. |
| 2005/0015805 | A1 | 1/2005 | Iwamura |
| 2005/0033960 | A1 | 2/2005 | Vialen et al. |
| 2005/0041673 | A1 | 2/2005 | Jiang et al. |
| 2005/0149757 | A1 | 7/2005 | Corbett et al. |
| 2005/0169222 | A1 | 8/2005 | Ayyagari et al. |
| 2005/0170835 | A1 | 8/2005 | Ayyagari et al. |
| 2005/0174950 | A1 | 8/2005 | Ayyagari |
| 2005/0193116 | A1 | 9/2005 | Ayyagari et al. |
| 2005/0243765 | A1 | 11/2005 | Schrader et al. |
| 2006/0007907 | A1 | 1/2006 | Shao et al. |
| 2006/0031477 | A1 | 2/2006 | Ayyagari |
| 2009/0238153 | A1 | 9/2009 | Sim |

FOREIGN PATENT DOCUMENTS

| | | |
|---|---|---|
| EP | 1 693 998 A1 | 8/2006 |
| WO | WO 03/015291 A2 | 2/2003 |
| WO | WO 03/026224 A1 | 3/2003 |
| WO | WO 2005/062546 A1 | 7/2005 |

OTHER PUBLICATIONS

Schneier, Bruce, "Applied Cryptography,"1996, John Wiley & Sons, Inc., Second Edition, pp. 34-38, pp. 48-49, pp. 513-514, and pp. 518-520.

Notice of Allowance for U.S. Appl. No. 11/420,945 dated May 5, 2010.

Final Office action for U.S. Appl. No. 11/388,869 dated Jan. 14, 2010.

Non-Final Office action for U.S. Appl. No. 11/388,869 dated Jun. 10, 2009.

Non-Final Office action for U.S. Appl. No. 11/421,155 dated Mar. 2, 2010.

Notice of Pre-Appeal Brief for U.S. Appl. No. 11/388,584 dated Jun. 16, 2010.

Non-Final Office action for U.S. Appl. No. 11/421,155 dated Feb. 23, 2009.

Final Office action for U.S. Appl. No. 11/421,155 dated Aug. 12, 2009.

Non-Final Office action for U.S. Appl. No. 11/388,869 dated Jul. 7, 2010.

Non-Final Office action for U.S. Appl. No. 11/420,945, dated Jan. 29, 2009.

Non-Final Office action for U.S. Appl. No. 11/420,945, dated Jul. 8, 2009.

Non-Final Office action for U.S. Appl. No. 11/420,432 dated Apr. 28, 2009.

Final Office action for U.S. Appl. No. 11/420,432 dated Nov. 23, 2009.

Non-Final Office action for U.S. Appl. No. 11/420,432 dated Mar. 25, 2010.

Notice of Allowance for U.S. Appl. No. 11/421,155 dated Aug. 5, 2010.

Notice of Allowance for U.S. Appl. No. 12/728,040 dated Aug. 23, 2010.

Final Office action for U.S. Appl. No. 11/420,432 mailed Aug. 31, 2010.

Office Action for U.S. Appl. No. 11/388,869, mailed Jun. 9, 2011.

* cited by examiner

METHOD FOR AUTOMATICALLY PROVIDING QUALITY OF SERVICE

CROSS-REFERENCE TO RELATED APPLICATIONS

This application claims the benefit of U.S. Provisional Patent Application Ser. No. 60/703,381 filed Jul. 27, 2005, entitled "Method for Automatically Providing Quality of Service," which is hereby incorporated by reference herein for all purposes.

FIELD OF THE INVENTION

The invention relates to methods, devices, and systems for establishing connections, particularly, automatically establishing connections within a centralized network.

BACKGROUND

Quality of service is desirable in a network. A manner of providing quality of service in a network is thus highly desirable.

SUMMARY

In one aspect of the invention, a method—of automatically establishing a connection for at least one packet that has no associated classifier rule matched by a classifier—is provided. The method includes the steps of examining the at least one packet; releasing the at least one packet to connectionless traffic after the examining step; determining whether the at least one packet is connection worthy; and if the at least one packet is connection worthy, updating the classifier with at least one classifier rule related to the at least one packet, wherein the at least one classifier rule comprises connection information and a set of one or more criteria.

In another aspect, a device is provided. This device is adapted to be operably coupled to a network. This device includes a classifier, an auto-connect service module, and a rule configurator module. The classifier is adapted to match at least one packet with at least one rule in a set of classifier rules; and associate the at least one packet to one or more connections when the at least one packet matches with the at least one rule. The auto-connect service module is adapted to, if the at least one packet is not matched with the at least one rule in the set of classifier rules, examine the at least one packet; release the at least one packet to connectionless traffic after the examination; and determine whether the at least one packet is connection worthy. The rule configurator module, on the other hand, is adapted to, if the at least one packet is determined connection worthy, update the classifier with at least one new classifier rule wherein the at least one new classifier rule is based on the at least one packet, the at least one new classifier rule comprising connection information and a set of one or more criteria.

In another aspect of the invention, a system is provided. The system includes a first device, a second device that is adapted to receive packets via the initiated connection, and a network segment that is operably connecting the first device and the second device. The first device includes a classifier, an auto-connect service module, and a rule configurator module. The classifier is adapted to match at least one packet with at least one rule in a set of classifier rules; and associate the at least one packet to one or more connections when the at least one packet matches with the at least one rule. The auto-connect service module is adapted to, if the at least one packet is not matched with the at least one rule in the set of classifier rules, examine the at least one packet; release the at least one packet to connectionless traffic after the examination; determine whether the at least one packet is connection worthy; generate a connection specification for the at least one packet; and initiate a connection based on the generated connection specification. The rule configurator module is adapted to, if the at least one packet is determined connection worthy, update the classifier with at least one new classifier rule wherein the at least one new classifier rule is based on the at least one packet, the at least one new classifier rule comprising connection information and a set of one or more criteria.

BRIEF DESCRIPTION OF THE DRAWINGS

The present invention is illustrated by way of example and not limitation in the figures of the accompanying drawings, and in which.

DETAILED DESCRIPTION OF THE INVENTION

Figure 1:
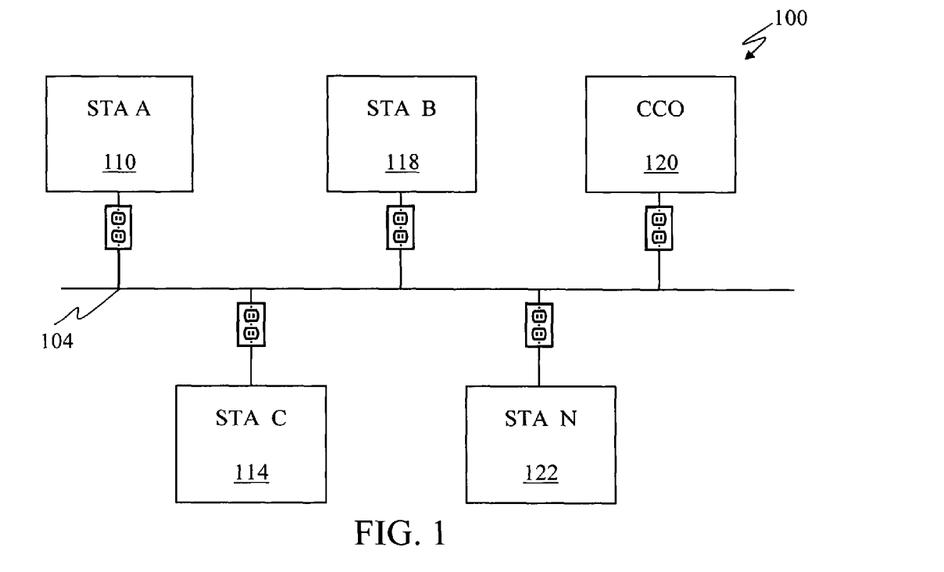
FIG. 1 is a high-level block diagram of an exemplary network according to an embodiment of the invention.
Figure 2:
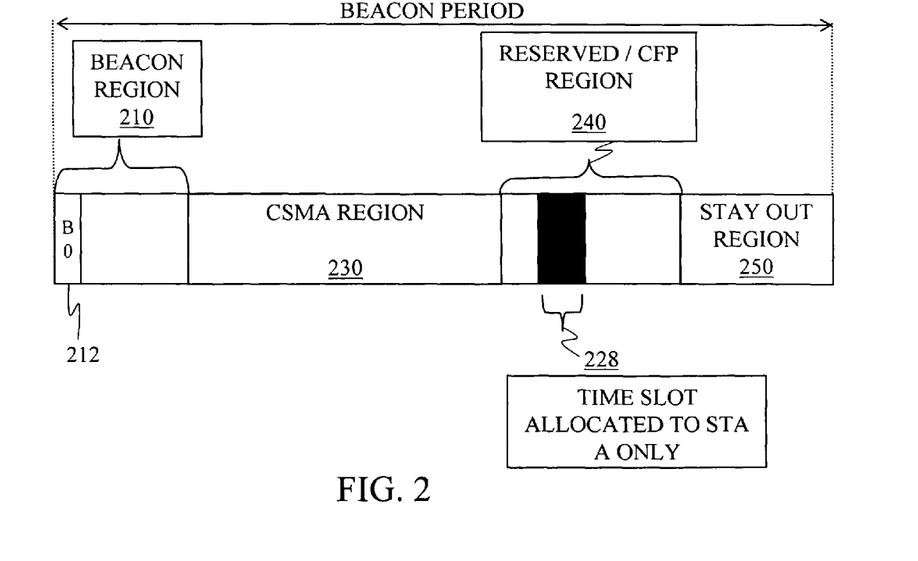
FIG. 2 is an exemplary beacon period according to an embodiment of the invention.

To better understand the figures, reference numerals within the one hundred series, for example, 100 and 118, are initially introduced in FIG. 1, reference numerals in the two hundred series, for example, 210 and 212, are initially introduced in FIG. 2, and so on and so forth. So, reference numerals in the eight hundred series, e.g. 810 and 812, are initially introduced in FIG. 8.

The embodiments of the present invention support connection-oriented services, but particularly support the automatic creation or establishment of connections for packets which have no initial associated connections. In some embodiments, this auto-connect service is provided in a power line communication network.

FIG. 1 is an exemplary diagram of a network 100 according to some embodiments of the invention. In some embodiments, the network has portions of its data communication network segments 104 over power lines. Power line communication (PLC), sometimes also called broadband over power line (BPL), is a wire-based technology—which in particular uses medium and low voltage power lines for data communications. These power line networks include networks created by using electrical wirings, for example, in homes and buildings. Data communicated for example, include, but are not limited to, music, streaming videos, files, voice, databases, text files, control commands, and network keys. This exemplary network 100 may also include other wired, e.g., Ethernet, or wireless networks.

The exemplary network 100, in this embodiment, includes one centralized network (CN). A CN typically includes a central network coordinator also called the central coordinator (CCO) 120 that controls network activities, such as network timing, bandwidth allocation, and security, e.g., authentication and key management. For each centralized network, there is typically one instance of a CCO 120 and one or more stations 110, 114, 118, 122. In some embodiments, the CCO is initially the only device and station within the CN. In another exemplary embodiment, the data communication network 100 includes more than one centralized network, with each CN controlled by a CCO. When two or more CNs are available, these CNs may operate, for example, in the coordinated mode.

In some embodiments, a CCO is a station (STA) or device that typically controls the timing and resource, e.g., bandwidth allocation, of all stations within the centralized network. A CCO may also control and schedule its own network activities. The role of the CCO, however, generally may be transferred from one STA to another, if needed or so desired. To keep the centralized network synchronized and to indicate bandwidth allocation, the CCO transmits beacons to maintain the timing of the network. The CCO also determines and may select or authorize the determined stations, which stations in the network, may access the channel at a given time. A CCO may also coordinate with other CCOs in interfering neighbor networks to enable neighbor networks to coexist and share the same channel.

In some embodiments, stations 110, 114, 118, 122 that may be connected to this exemplary PLC network include devices such as monitors, TVs, VCRs, DVD player/recorders, other audiovisual devices, computers, game consoles, sound systems, information appliances, smart-home technology appliances, home audio equipment, or any other device that is PLC-enabled or compatible, or is able to communicate via the power lines. Although the embodiments of the invention herein are exemplified and discussed using power line networks, features of the present invention are also relevant to other networks; for example, but not limited to, wired or wireless networks, networks that have a centralized architecture with a central coordinator controlling the activities of the stations in the network, networks with a different network architecture and topology, or to other networks applying a different network protocol. The use of power line networks in exemplary configurations is intended to aid in understanding the features of the several embodiments of the invention.

In some embodiments of the invention, the network 100 may use time division multiplexing (TDM) as a method of multiple data streams sharing a signal according to time segments. The networks of the present invention may also use other time-division multiplexing technology, e.g., orthogonal frequency-division or combinations and variations thereof. Other technologies supporting PLC, e.g., orthogonal frequency-division multiplexing (OFDM), however, may also be used within the network and system.

Beacons:

In some embodiments, a CCO 120 manages the activities of stations within its centralized network using, for example, beacons. Beacons are typically control messages that identify the frame configuration and the bandwidth (BW) assignments within a time frame to multiple networks and to stations within a given network. Beacons are typically broadcasted by each CCO, e.g., as a multi-network broadcast, and are decoded by the stations within the network and, in some embodiments by the CCOs of neighbor networks. Beacons are also typically tagged or identified, such that stations within a network decode and follow the BW allocation of their own network beacon and not the beacon of another network. Beacons are also transmitted or broadcasted, typically periodically, into the networks.

FIG. 2 is an exemplary diagram of a beacon period for the exemplary network 100 according to an embodiment of the invention. In some embodiments of the invention, a beacon period comprises several parts or regions. Each region is further typically defined into one or more time slots (e.g., 212 and 228). In some embodiments, a beacon period comprises four regions:

Beacon Region:

In some embodiments, a beacon region 210 is the region wherein a CCO is able to transmit its own beacon. The beacon region generally includes a plurality of a certain number of beacon or time slots, with the duration of each beacon slot typically sufficient for the transmission of a beacon. In some embodiments, the duration of each beacon slot is equal to the sum of the duration of a beacon PHY protocol data unit (PPDU) and the interframe space. A beacon region 210, in some embodiments, consists of one to a maximum number—typically defined within the system of time slots or beacon slots. In some embodiments, the size of the beacon region, including the number of time slots, may be adjusted dynamically by the CCO. In this exemplary embodiment, the CCO 120 transmits its own beacon at beacon time slot BO 212.

Carrier Sense Multiple Access (CSMA) region or Contention Period (CP) Region:

The CSMA region 230 is a region wherein any one or more of many contention access protocols are used to share the medium and to coordinate network traffic. In some embodiments, a CSMA/CA protocol may be used. A network may have one or more CP or CSMA regions. In some embodiments, to be compatible, the CSMA or CP regions of one centralized network do not overlap with the reserved or contention-free period regions of other networks. Communication, however, between two or more interfering networks may be made during overlapping CSMA regions.

Reserved Region or Contention-Free-Period (CFP) Region:

The reserved or CFP region 240 is a period when only stations that have explicit authorization from the CCO are allowed to transmit. A reserved region is a time interval that is typically reserved by a network. The network that has been allocated or has acquired control of the reserved region typically schedules the transmission of its contention-free links here. In addition, the CCO may also schedule CSMA allocations that may be used only by the STAs in that network. For example, time slot 228 in the reserved region 240 has been allocated by the CCO to STA A 110, so that STA A 110 may freely transmit at that time slot or interval 228 without interference, conflict, or contention from other stations 114, 118, 120, 122 within the network. Explained in another way, in that time slot 228, STA A may freely transmit, while other stations in that network are typically silent. In other embodiments, the CCO sends a message directly to the station informing that station when to transmit and sometimes even listen. A network may have any number of reserved regions in a beacon period.

Stayout Region:

The stayout region 250 is a period within the time frame when all stations assigned a stayout region are instructed by the CCO to remain silent, meaning no transmission. Typically, these stations are also not to use any contention access or contention-free access protocol. A stayout region is assigned to avoid conflicts with a station or the network that has been assigned a reserved region in the same time interval.

In general, a network specifies a stayout region if one or more of the neighboring networks, typically defined for example within a network interfering list, have specified a reserved region or a protected region in the same time interval.

In some embodiments, the various types of regions need not be allocated in one contiguous time interval. This means for example, that the various types of regions may interleave each other, e.g., a time frame or beacon period includes a beacon region, followed by a CSMA region, followed by a stayout region, followed by another CSMA region, and then followed by a reserved region. The various regions within a beacon period may also be of varying sizes with varying number of time slot intervals or durations. In some embodiments, the end time of each region type within a beacon period is stored, for example, in multiples of a defined allocation time unit—e.g., 0.32 msec.

In another alternative embodiment, a beacon period may include another region type (not shown) called a Protected Region. When a CCO detects the existence of another group, i.e., another CN or set of CNs with a different timing and if it optionally decides to coordinate with networks in that group, that CCO typically specifies a protected region in the same interval where the beacon region of the other group is located. Stations in a network typically are not allowed to transmit in a protected region. A neighboring group of networks, for example, may have a different beacon period start time.

Based on the beacons transmitted by the CCO, the devices within a network are able to share bandwidth using the same medium or channel, e.g. power line medium. The CCO in each network thus typically controls BW allocation and scheduling within its network. The stations within the network thus decode their own network beacons, and accordingly perform their functions, such as network transmission, following the beacon period allocations or schedule.

In some embodiments a beacon period may contain zero or more of each of the regions described above, i.e., not all regions are present. In some other embodiments, there are more than one instance of any or all of the exemplary regions described above.

Figure 3:
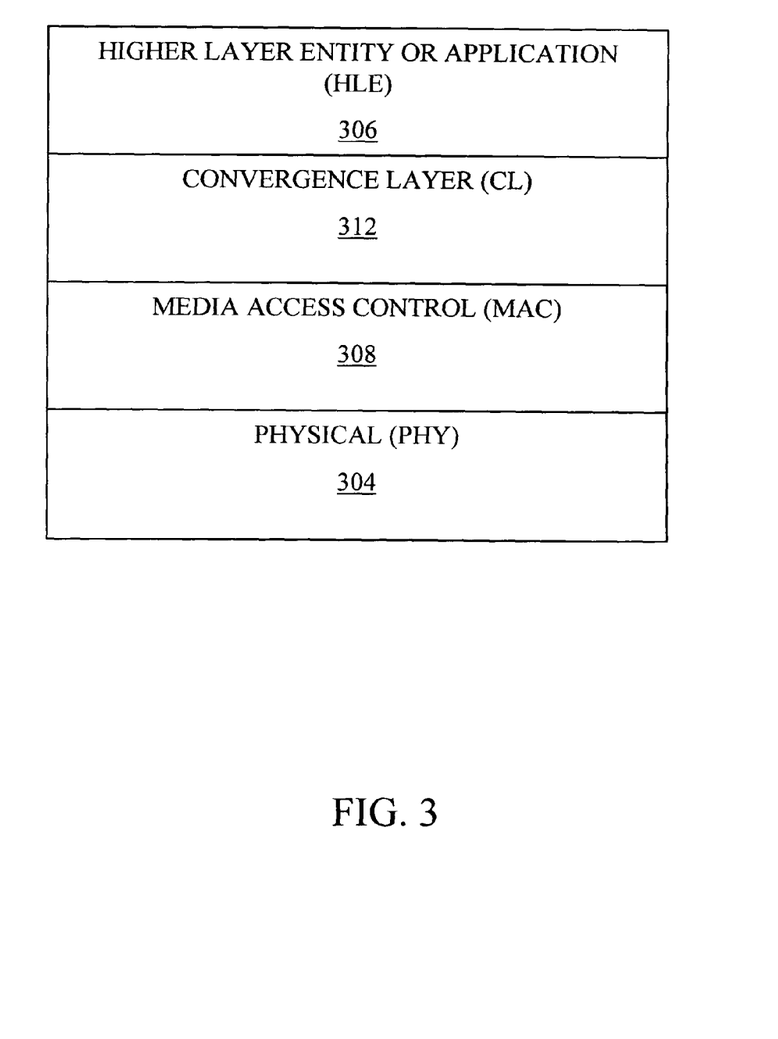
FIG. 3 is a high-level functional block diagram of an exemplary protocol architecture according to an embodiment of the invention.

FIG. 3 is an exemplary protocol architecture of some embodiments of the present invention. These protocol layers may be associated with the Open System Interconnection (OSI) reference model. The lowest layer is the physical layer (PHY) 304, which typically transmits and receives raw bits over a communication channel and encodes and/or decodes signals. Above the PHY layer 304, is the media access control (MAC) 308 layer, which typically transmits data in frames. Above the MAC layer 308, is the convergence layer (CL) 312, which typically provides functions specific to the service being provided or requested. The CL 312 is typically adapted to convert the service requirements of higher layer entities or applications 306 to the services offered by the lower layer entities 304, 308, 312. The CL 312 further provides a layer shielding higher-level applications 306 from the details or complexities of the MAC 308 and PHY 304 layers. The CL 312 typically accepts data packets through service access points (SAPs), e.g., at an interface, and processes such packets prior to sending them off to the MAC layer through the M1 interface. The functions of the CL 312 may include, for example, mapping of higher layer control plane procedures to procedures supported by the lower layers or lower layer entities, encapsulating protocol date unit framing of upper layers into native MAC/PHY frames, mapping an upper layer address into an appropriate address, translating upper layer quality of service (QoS) parameters into native MAC format, and the like. The higher layer entity or application 306 may include Ethernet, Internet Protocol (IP), ATM, FIREWIRE, IEEE 1394, Universal Plug and Play (UPnP), IP applications, digital audio/video multicasts, digital telephony, control applications, bridges, and the like.

Connections and Links:

In some embodiments, the network 100 provides connection-oriented service. A connection may be either unidirectional, i.e., data flows in only one direction, or bidirectional, i.e., data flows in both directions. A forward direction may be defined as the direction from the originating STA to the terminating STA and a reverse direction is the direction from the terminating STA to the originating STA. Explained in another way, a forward link is identified as originating at the STA that initiates the connection-establishment procedure and terminating on the station(s) responding to the connection establishment request. In some embodiments, connections are used to provide guarantees on Quality of Service (QoS). Connection-oriented traffic may use either the CFP or the CP/CSMA, typically depending on the QoS requirements of the connection.

A connection may be composed of links. A link is typically a unidirectional data flow, e.g., a packet or set of related packets, from typically the CL of the source of the link to the CL of one or more destinations of the link. Links may also be categorized as unicast or broadcast/multicast depending on the number of destinations of link. In some embodiments, a connection may be composed of one of the following exemplary combinations of links:

1. A single unicast forward link from the station that initiated the connection to the terminating station of the connection;
2. A single unicast reverse link from the terminating station of a connection to the initiating station of the connection;
3. Both (1) and (2)—i.e., a bi-directional connection; and
4. A single multicast/broadcast link from the station that initiated the connection to the terminating stations of the connection.

In some embodiments, a distinction between connections and links is made because, at the physical layer, each direction between two stations is likely to have different characteristics and may be allocated separately, if so desired. Links, however, are also connections. Furthermore, in some embodiments, different types of links may be supported, e.g., a link controlled by the CCO 120 and those links controlled just by STAs 110, 118, 114, 122.

Typically, every connection and/or every link has a connection specification (CSPEC) associated with it. A CSPEC typically contains the set of parameters that define the characteristics and QoS expectations of a connection. For bi-directional connections, a CSPEC is typically defined for each of the forward link and the reverse link. A unidirectional connection may specify only forward or reverse direction QoS requirements, depending on the direction in which the connection's data traffic flows.

Figure 4:
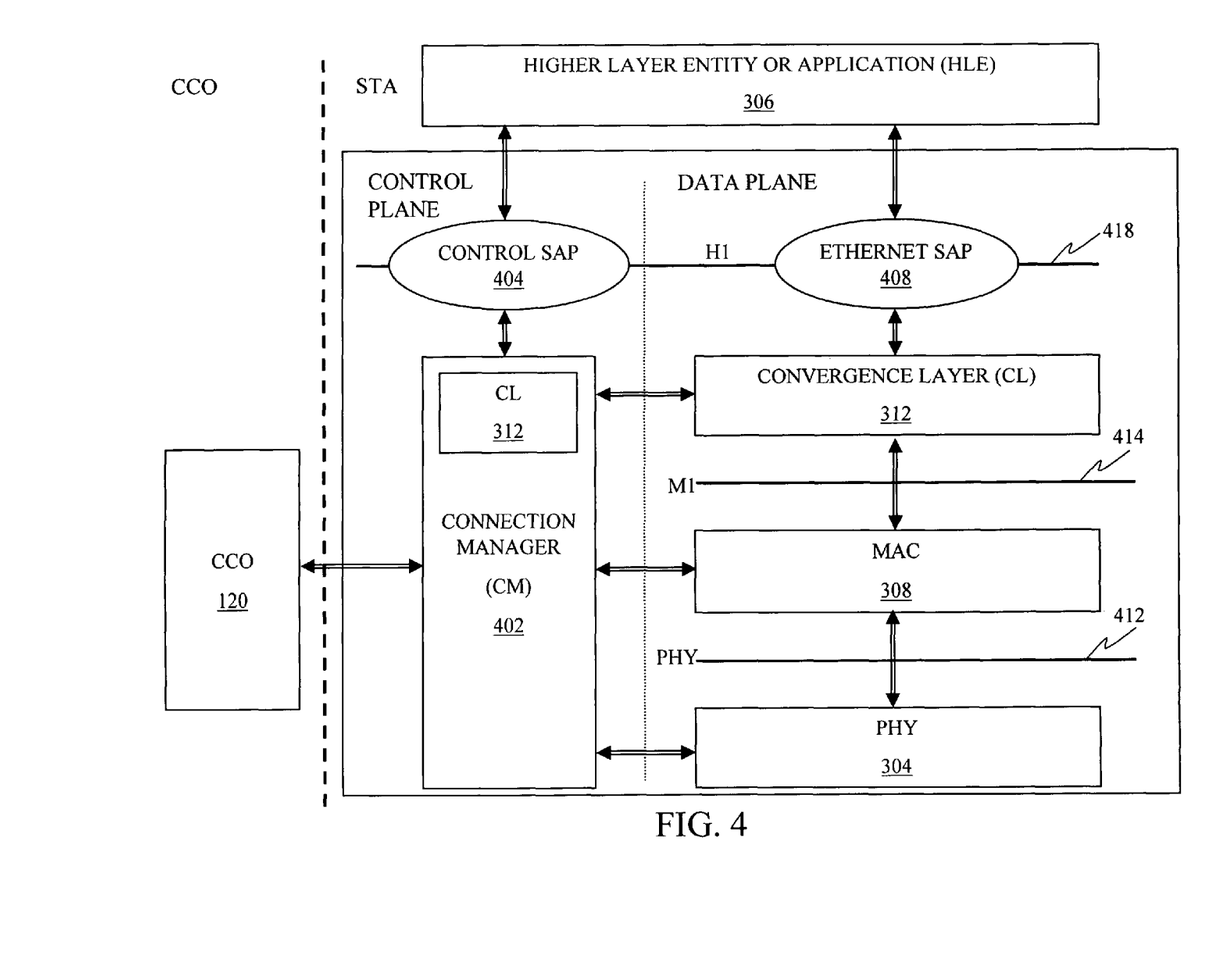
FIG. 4 is a block diagram of another exemplary protocol architecture according to an embodiment of the invention.

FIG. 4 shows an exemplary system architecture showing the protocol layers in more detail and in conjunction with a CCO 120. Typically, the connections for a STA are managed by a connection manager (CM) 402. The CM 402, in some embodiments functions as the control plane of the CL 312. In some embodiments, the CCO 120 may also communicate with the connection manager (CM) 402 of a station. Between adjacent layers is typically an interface 418, 414, 412, which defines which primitive operations and services the lower layer makes available to the upper or higher layer. In some embodiments, local connections are managed by the CMs 402, while global connections are managed by the CCO.

In some embodiments, the CL 312 includes the data plane between the H1 interface 418 and the M1 414 interface. The CL 312 typically receives data packets from the data service access points (SAPs) on one interface, for example, Ethernet SAP 408, processes the packets, including reformatting if appropriate, and directs the packets to the appropriate destination SAP on the other interface, e.g., an M1 SAP (not shown). In some embodiments, the CL 312 automatically provides, if appropriate, connection service, for example, for packets from legacy applications that start transmission without specifying QoS parameters, packets bridged from another network, and for packets where the HLE 306 does not establish connections. Thus, in some embodiments of the invention, connections are established with QoS CSPEC, even when the HLE does not establish the connection. Furthermore, devices within the network may be able to use CP or CFP time slots, for example, based on recognition of the application type or data-stream characteristics, thereby efficiently managing bandwidth allocation.

Typically, the HLE 306 communicates with the CL 312 through service access points (SAPs), e.g., Ethernet SAP, 408 at the H1 interface 418. In some embodiments, these data SAPs consist of primitives that enable applications to send and receive data via the protocol stack. The CL 312, in some embodiments, implements protocol adaptation layers (PAL) to service the SAPs and exchange data with the HLE. Furthermore, a control SAP 404 is between the HLE 306 and the CM 402. A control SAP 404 typically enables the HLE 306 to create and manage connections, monitor status and statistics, support vendor-specific primitives, and initialize stations. An M1 interface 414 is between the CL 312 and the MAC layer 308. In some embodiments, a SAP is used by the CL to pass data received from the HLEs to the MAC 308. A PHY interface 412 is between the MAC layer 308 and the PHY layer 304.

Figure 5:
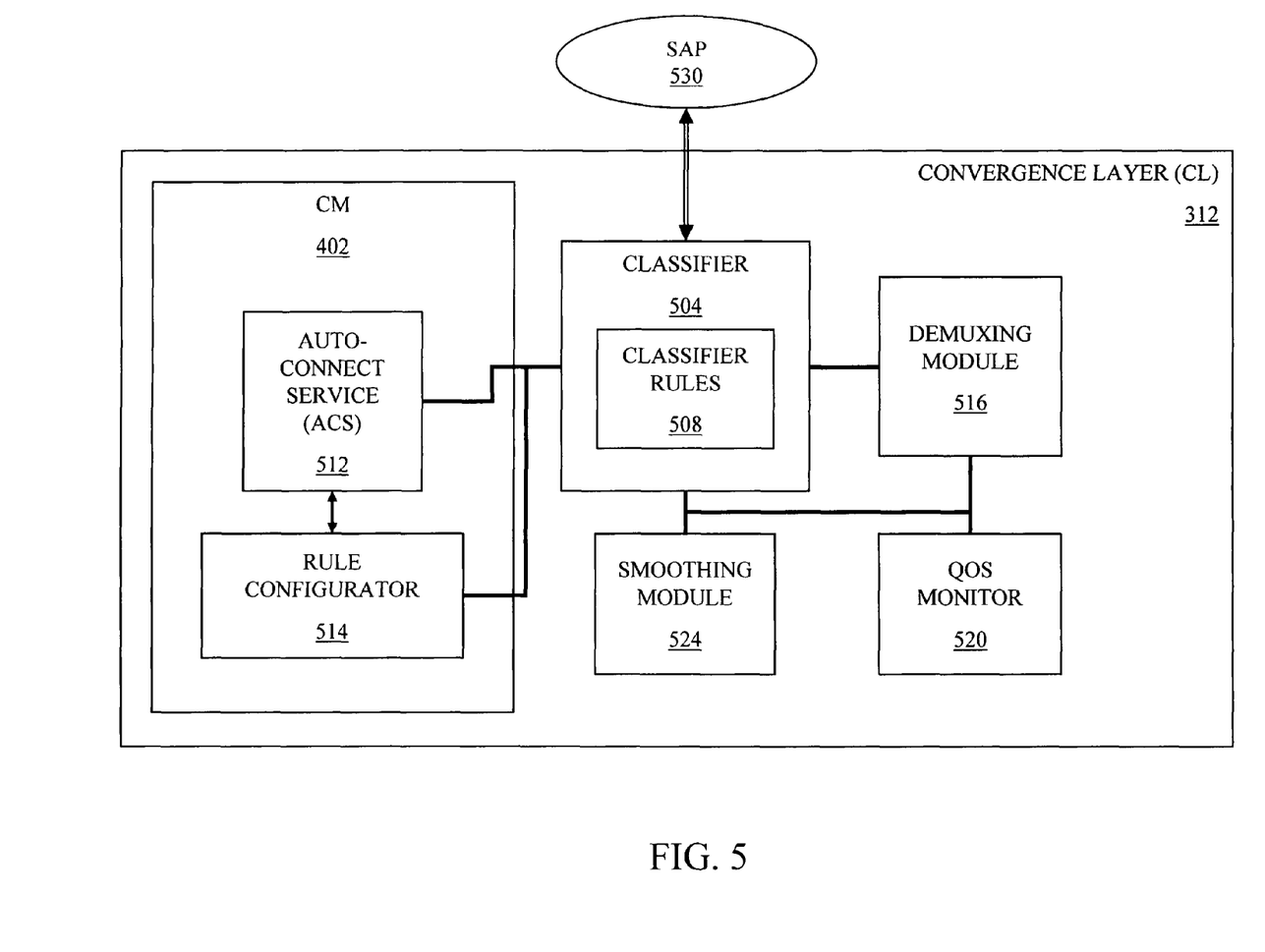
FIG. 5 is a functional block diagram of an exemplary convergence layer according to an embodiment of the invention.

FIG. 5 is a block diagram of an exemplary convergence layer (CL) 312, which includes the CM 402 functioning as the control plane. The exemplary embodiments of the CL 312 of the present invention support the auto-connect service or features described herein. Typically, the CM 402 includes an auto-connect service module (ACS) 512 and a rule configurator module 514. The CL 312, in general, may include a classifier module 504, a demuxing module 516, a QoS monitor module 520, and a smoothing module 524. Typically, the classifier 504 is associated with a set of classifier rules 508 and operates on that set of rules to match packets. One of ordinary skill in the art will appreciate that implementation variations are expected and are in the scope of the present invention. Furthermore, some or all of the functions of the CM 402 may be incorporated as part of the CL 312. One of ordinary skill in the art will further appreciate that the functions described herein may be distributed to other modules and/or combined with other modules. The various modules in the CL 312 may interface with each other and may be combined.

The smoothing module 524 typically provides point-to-point smoothing, e.g., jitter control and delay compensation, with HLEs that request such a feature. In general, the terms "smoothing," "delay compensation," and "jitter control" refer to the smooth delivery of packets to the destination (rendering) application. Point-to-point smoothing may be performed between two arbitrary points along the data path between the source and the destination. It is generally performed without awareness of or access to any timing information internal to the data stream.

A classifier 504, typically in the transmitter or transmitting device or station, maps or associates individual data packets, from various SAPs 530, into corresponding connections, typically by using a set of classifier rules 508. The classifier 504 may receive incoming packets from the HLE or application 306 via a data SAP 530. Each SAP may have one or more associated classifiers. This set of classifier rules 508 may contain a set of rules, e.g., parameters or information used by the classifier module 504 to detect individual streams of packets from all the packets that flow across the CL data SAPs. Each classifier rule 508 may also include a rule priority and a connection identifier, e.g., a link ID (LID), with which the packet may be compared or matched. The classifier 504 may also be adapted to use the rule priority parameter of each rule to determine the order in which the rules are to be applied to the packet. If a packet delivered to or received by the classifier 504 matches a classifier rule 508, the received packet is then sent over or transferred to the referenced connection, e.g., indicated by a connection identifier, associated with that classifier rule. This set or sets of classifier rules are typically local to each station and are not typically transmitted across the network. In some embodiments, several classifier rules may be associated with the same connection. A set of classifier rules may also indicate the source and destination MAC addresses and the TCP source and destination ports of the connection. In some embodiments, the classifier rules 508 are provided by the application or HLE 306, or in the case of automatic connection establishment by the rule configurator module 514.

In some embodiments, only one SAP/PAL pair 530 is defined, e.g., Ethernet II-class, for the CL 312. All received packets are sent directly to this SAP, i.e., demuxing is optional. In some embodiments, if additional SAPs are added, data packets may be demuxed by the demuxing module 516 to deliver demuxed data packets to the appropriate SAP. In some embodiments, each received packet may contain a connection identifier, e.g., an LID, and a temporary equipment identifier that uniquely identify the connection, and hence the SAP with which the connection is associated.

In some embodiments, certain operations are performed when packets do not match any of the classifier rules. These unmatched packets may be assigned to a "best-effort" contention period traffic, processed by the ACS module 512 to automatically obtain an associated connection—auto-connect service, or be discarded. In some alternative embodiments, these operations may be identified as default rules and/or operations within a classifier.

The auto-connect service (ACS) module 512 typically determines and establishes connections for packets that the classifier is unable to match with its set of classifier rules. The ACS module 512 may also detect data flows and may then establish, maintain, and teardown, if appropriate, connections with QoS for such data flows.

The rule configurator module 514 of the CM 402 typically manages the one or more classifiers 504 of the convergence layer 312, including configuring and updating the classifiers with updated/new classifier rules 508. Typically when a new connection is established, the CM 402, particularly the rule configurator module 514, configures the classifier of the associated CL port for that connection with classification rules 508. These rules enable the classifier to map packets from the CL port to the appropriate LID or connection. If the classifier, however, is configured by the CM to report unmatched packets, the classifier may inform the CM, particularly the ACS module 512, of any received unmatched packets, including those packets' destination MAC address and source CL port.

Table I below shows an exemplary classifier rule structure. Depending on system implementation and design, the complexity of masking, bit manipulation, e.g., ANDing or ORing, and number of rules for matching purposes may vary. In some embodiments, the implementation for classifying packets to streams may also be performed. For example, an exemplary embodiment may have multiple audio visual (AV) data SAPs with each SAP associated with an individual connection. In such embodiment, the classifier 504 may easily determine the connection, e.g., via LID, of each packet by just determining the SAP from which the packet was received.

TABLE I

Exemplary Classifier Rule Structure

| Field Name | Description |
|---|---|
| LID | Link ID or Connection Identifier |
| Priority | Rule Priority |
| Number of Classification Parameters | The count of classification parameters that follow. Each classification parameter typically has a unique identifier and parameters that define the match criteria for that parameter. |
| Classification Parameter 1 | The first of the classification parameters |
| ... | ... |
| Classification Parameter N | The last of the classification parameters |

Table II below shows an exemplary table for exemplary classifier rules for Ethernet II-Class Data SAP.

| | Name | Values |
|---|---|---|
| Ethernet II | Destination MAC address | DstValue, DstMask. A match occurs when the DstValue = ([the packet's destination MAC address] AND DstMask) |
| | Source MAC address | SrcValue, SrcMask. A match occurs when the SrcValue = ([the packet's source IP address] AND SrcMask) |
| | FrameType | The Ethernet Type field |
| IEEE802.1Q | UserPriority VLAN ID | |
| IPv4 | IP Source address | SrcValue, SrcMask. A match occurs when the SrcValue = ([the packet's source IP address] AND SrcMask) |
| | IP Destination address | DstValue, DstMask. A match occurs when the DstValue = ([the packet's destination IP address] AND DstMask) |
| | IP Protocol | Protocol number (0 . . . 65535) |
| | IP Type of Service | High, Low, Mask. A match occurs when Low <= ([the packet's IPv4 Type of Service] AND Mask) <= High |
| IPv6 | IPv6Source address | SrcValue, SrcMask. A match occurs when the SrcValue = ([the packet's source IP address] AND SrcMask) |
| | IPv6Destination address | DstValue, DstMask. A match occurs when the DstValue = ([the packet's destination IP address] AND DstMask) |
| | IPv6Protocol Type in Next Header | Protocol number (0 . . . 65535) |
| | IPv6 Traffic Class | High, Low, Mask. A match occurs when Low <= ([the packet's IPv4 Type of Service] AND Mask) <= High |
| | IPv6Flow Label | High, Low, Mask. A match occurs when Low <= ([the packet's IPv6 Flow Label] AND Mask) <= High |
| TCP and UDP | IP Source Port | SrcPort, SrcMask. A match occurs when the SrcPort = ([the packet's source IP port] AND SrcMask) |
| | IP Destination Port | DstPort, DstMask. A match occurs when the DstPort = ([the packet's destination IP port] AND DstMask) |

Using the above exemplary table:
IPv6 Header+Next Header=Routing;
Routing Header+Next Header=Fragment;
Fragment Header+Next Header=TCP;
TCP Header+TCP data Thus, the location of Transmission Control Protocol (TCP) or User Datagram Protocol (UDP) port is changeable in IPv6.

The QoS monitor module 520 typically gathers and monitors statistics and data traffic to confirm that the data transport service levels being delivered satisfy the guaranteed QoS service level. The QoS monitoring 520 capabilities may be done by the transmitting and/or receiving station.

Figure 6:
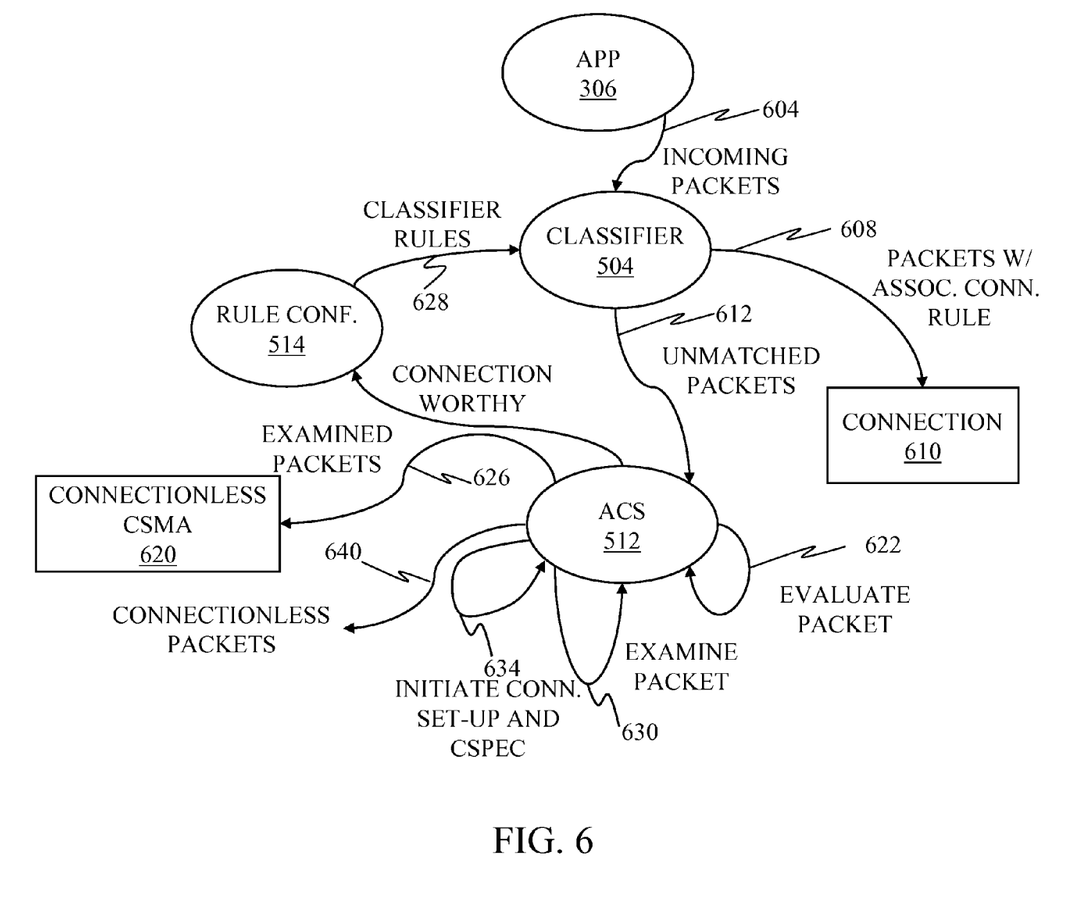
FIG. 6 is an exemplary state diagram of the auto-connect features according to an embodiment of the invention.

FIG. 6 is an exemplary state diagram showing how packets are processed according to some embodiments of the invention. Typically, a packet 604 is received by a classifier 504 from a higher layer entity or application 306, typically via an appropriate SAP. This incoming packet 604 is then processed by the classifier 504 to determine if the packet matches any of its classifier rules. If the processed packet matches a classifier rule 608, the classifier 504 then associates or maps such packet from the CL port to the appropriate LID or connection 610 based on the matched rule. Alternatively, if the received packet does not match any of the classifier rules, this unmatched packet 612 is sent to the ACS module 512. In some embodiments, the classifier 504 may also send the ACS 512 a "no match" notification indicating that the packet is unmatched by the classifier. In some embodiments, this "no match" indication may be provided by transmitting the unmatched packet to the ACS. In some embodiments, the ACS may be presented with every data packet delivered to the H1 interface that is not part of any established connection, i.e., not matched by the classifier. In some embodiments, only portions of such data packets are sent to the ACS 512.

The ACS 512 may receive varying kinds of packets to evaluate and to establish connection(s), if appropriate. Such packets may include streamed packets for which transport in the CFP is appropriate, real-time transport protocol (RTP) packets for which either CFP or CP transport may be appropriate, prioritized packets for which either CFP or CP transport (either connection-oriented or connectionless) may be appropriate, and common packets for which connectionless CP transport is appropriate.

Upon receipt of the unmatched packet, the ACS 512 then examines 630 the packet, for example, reading the packet and determining information stored and carried in the packet. The ACS 512 also typically releases the examined packets 626 for connectionless transport in CP/CSMA 620 after such examination. Typically, the ACS 512 does not hold packets while the ACS is determining whether a connection is warranted or while a connection is being established.

The ACS 512 also evaluates the packet 622 to determine if the packet is connection worthy. Such evaluation may include evaluating whether connection-oriented service is appropriate for the packet sequence of which the current packet may be a part—"connection worthy," or whether the packet is to be transported via connectionless service. If the packet is determined to be not connection worthy, the packet is sent for connectionless traffic, e.g., best effort 640. The decision about the manner in which packet(s) are to be transported may be based on one or more of the following:

a) Policies established for identifying automatic connections, e.g., established by an HLE or application;
b) Templates: providing certain default rules; e.g., associating traffic on a particular IP port with a particular usage, thereby implying a level of QoS from that usage; and c) Heuristics: attempting to identify a need for a particular level of QoS from the statistical behavior of traffic offered. For example, the ACS may monitor successive packets and judge whether they are streaming data (i.e., whether the packets should be transferred with reserved bandwidth channel). If it judges streaming data, the ACS may decide on the appropriate QoS parameters and establish a connection. Such heuristics may also be based, for example, on the volume and regularity of data which is being transmitted.

The number of packets the ACS may examine to determine whether the packets are part of a "connection worthy" data flow may depend on the method used for determination. If templates and/or policies are used, the ACS may be able to determine connection-worthiness from a single packet. If heuristics, however, are used, the ACS may need to examine multiple packets to determine how fast packets are arriving and how much bandwidth would be required for a connection.

If the ACS 512 determines that the incoming or received unmatched packet is connection worthy, the ACS 512 initiates the connection establishment process and specifies a connection specification for that packet 634. Typically, the rule configurator module 514 updates the classifier with the appropriate rules 628, including connection identifiers, so future packets may be appropriately processed by the classifier. The ACS module 512 may also manage the connections it establishes, including reconfiguration and teardown, which the HLE would normally perform. In this embodiment, the capabilities of connection reconfiguration and connection teardown are also available for the ACS module 512. In some embodiments, implementers of the features of the present invention may establish controls internal to the control plane to enable the ACS to have access to the same capabilities as an HLE, including awareness of the data flow of the connections that the ACS establishes.

Once the ACS determines that a connection should be established for that particular data flow or packet, it may establish an initial CSPEC, similar to the process, for example, performed by the HLE when establishing a connection. While connections requested by an HLE are connections between HLEs, connections established by ACS are typically not. The difference is whether the connection is negotiated between HLEs or between CLs. Typically, connections established by the ACS are negotiated between the CLs of the source and destination devices. To ensure that the HLE is not notified of the events triggered by the establishing or maintenance of automatic connections, connections established by ACS may be indicated as such, for example, via a parameter field, and the CL 312 typically does not communicate connection-related primitives to the HLE for connections made by the ACS The ACS may also be responsible for performing activities that would normally be undertaken by the HLE, including management, reconfiguration, and teardown of the connections it establishes. In particular, the ACS may be responsible for:

a) Monitoring the data flow;
b) Ensuring that the initial CSPEC it assigned is appropriate for the data flow; and
c) Making the appropriate adjustments to that CSPEC.

This monitoring of automatic connections performed by the ACS differs from the monitoring performed by the convergence layer, in general. CL monitoring is to ensure that service level matches that guaranteed by the CSPEC. ACS monitoring for connections automatically established is to ensure that QoS levels established in the CSPEC generated by ACS are appropriate for the data traffic carried by the automatic connection.

In some embodiments, a connection is created by the ACS by initiating a messaging sequence to set up the connection. Based on the CSPEC provided by the ACS, the ACS or the CM 402 may determine how many links are required and whether each link should be a global link or local link. The CM 402, particularly the ACS 512, may then communicate with the CM or the ACS of the destination station, and possibly with the CCO 120, to establish the one or more links to establish or create the connection. Once the connection is established, the ACS 512 is responsible for monitoring if the generated CSPEC is appropriate. If a link or connection is not performing according to its CSPEC, the ACS 512 typically initiates a link reconfiguration with a new CSPEC or it may tear down the connection. In some embodiments, it is possible to have several connections between two STAs. In some embodiments, the connection may be between more than two stations. Each of these connections may have either global or local links along with its own, possibly unique, CSPEC.

In some embodiments, global links are established and controlled by the CCO 120 at the request of an ACS 512. The source STA and the destination STA, for example, may request sufficient BW from the CCO to guarantee QoS. The CCO typically assigns the global link a dedicated BW allocation and a global link ID (GLID) that is typically unique in a network. In some embodiments, until the CCO assigns the GLID, the global link may be identified by the Connection ID (CID) assigned by the ACS that initiated the connection. Typically, each connection requested is associated with a CID. In some embodiments, a global link is managed globally by the CCO and locally by the CMs, particularly the ACS for auto-connect services, on each of the STAs involved in the connection. A global link may be used in contention-free and contention traffic. A GLID may also be used to identify different types of allocation. For contention-free allocation, for example, the GLID or another field may be used to identify the unique link that may use the medium.

Figure 7:
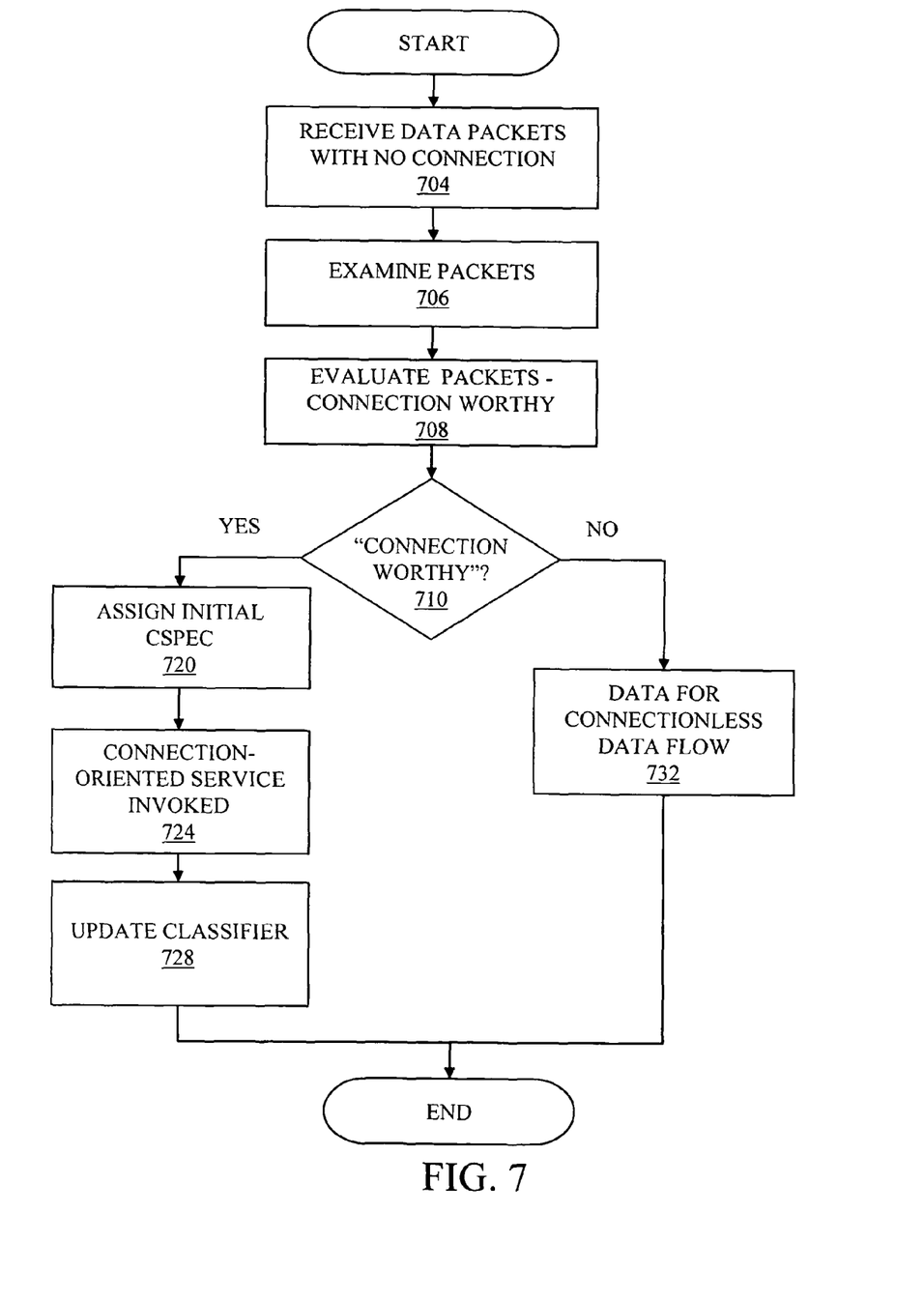
FIG. 7 is a flowchart of an exemplary process to automatically establish a connection for an unmatched packet according to an embodiment of the invention.

FIG. 7 shows a flowchart of an exemplary auto-connect service feature of the present invention. In the first operation, the ACS is initiated by receiving data packets with no associated connection (step 704). The ACS then examines the packet to extract or determine information contained in the packet (step 706). The packet is then typically immediately released for connectionless traffic. The ACS then determines whether the unmatched packet or packets are entitled to a connection, i.e., whether each is "connection worthy" (step 708). If the ACS determines that the data packet(s) are not connection worthy (decision 710), the packets are typically released immediately for connectionless transport (step 732). In some embodiments, the packets are released for connectionless service transport in the contention period or carrier sense multiple access (CSMA) traffic as soon as the ACS finishes examining or reading the packet. Once the ACS determines that a connection should be established, the ACS establishes an initial CSPEC (step 720). The CSPEC typically defines the connection requirements. In defining the CSPEC, the ACS typically follows the same process performed by an application for establishing the connection. A connection-oriented service is then typically invoked, e.g., by initiating a connection set-up process with the appropriate device or station (step 724), and the classifier updated (step 728), typically with new classifier rules, so that future packets are handled correctly by the classifier without invoking the ACS process again. Thus, the ACS generally no longer processes those packets types because the classifier is routing them to the new connection based on the new rules.

Figure 8:
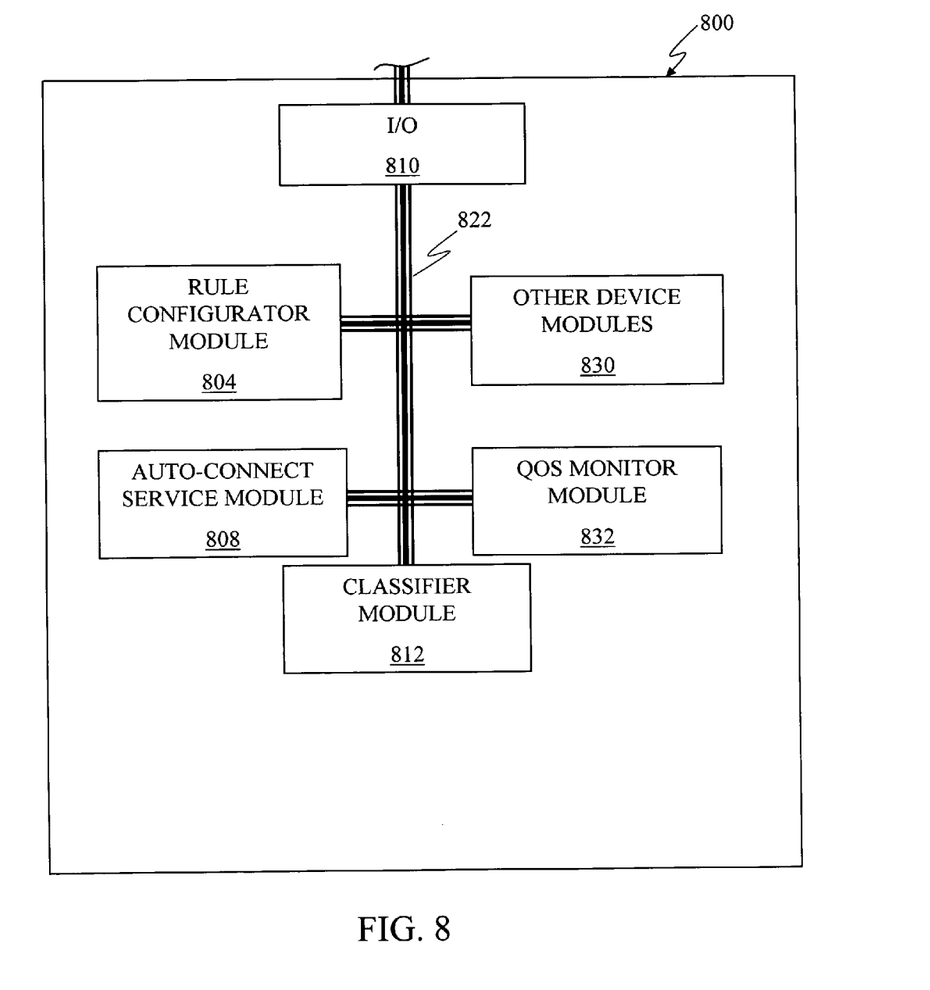
FIG. 8 is a functional block diagram of an exemplary convergence layer incorporated in a device according to an embodiment of the invention.

FIG. 8 is a high-level functional block diagram of an exemplary device 800 incorporating the auto-connect service features, according to some embodiments of the invention. This exemplary device 800 may include an I/O interface 810, a rule configurator module 804, an auto-connect service module 808, a classifier module 812, a QoS monitor module 832, and other station modules, such as a demuxing module, a smoothing module, and the like. The exemplary device 800 may also include a memory, which may be volatile or non-volatile, for example, for storing the classifier rules used by the classier module 812 to classify packets into appropriate connections, if available. The I/O interface 810 typically enables the device 800 to communicate with other devices within the network.

The rule configurator module 804 performs the functions described above, particularly updating the classifier rules used by the classifier module. The ACS module 808 performs the auto-connect features described above, in particular, examining or reading the packets, determining whether packets are connection worthy, establishing appropriate CSPECs for connection worthy packets, monitoring that the CSPECs generated by the ACS are appropriate for the data traffic carried by the automatic connections, and managing, reconfiguring, and tearing down automatic connections established by the ACS. Connection reconfiguration may occur when the CSPEC parameters of the connection have changed. Connection teardowns may be initiated when one or more violations of the CSPEC occur for those automatic connections. In some embodiments, teardowns may be invoked if requested. When the ACS determines that the automatic connection needs to be reconfigured, the ACS negotiates with the other station for reconfiguration, which may typically involve changes to the CSPEC parameters, allocation changes, and a modification to the automatic connection.

The classifier module 812 generally classifies incoming packets from HLEs or applications by matching the packets or data flow to the appropriate connections, if appropriate. The QoS monitor module 832 monitors that the service level of the CL in general matches that which is guaranteed or defined within the CSPEC. The QoS monitor module 832 thus typically continuously monitors existing connections, including links, for adherence to the negotiated traffic characteristics (traffic policing) and QoS guarantees.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

We claim:

1. A method of automatically establishing a connection for at least one packet that has no associated classifier rule matched by a classifier, the method comprising the steps of:

determining whether the at least one packet is connection-oriented service worthy; and if the at least one packet, having no associated classifier rule matched by the classifier, is connection-oriented service worthy, updating the classifier with at least one classifier rule related to the at least one packet, the at least one classifier rule comprising connection information and a set of one or more criteria.

2. The method of claim 1, wherein the step of determining whether the at least one packet is connection-oriented service worthy is based on at least one of the following:

one or more policies;

one or more templates; and one or more heuristic algorithms.

3. The method of claim 1, wherein the at least one classifier rule further comprises a rule priority.

4. The method of claim 1, wherein the at least one packet is transmitted in a power line communication network.

5. The method of claim 1, further comprising the steps of:

generating a connection specification for the at least one packet; and initiating the connection based on the generated connection specification.

6. The method of claim 5, further comprising the step of:

transmitting the at least one packet, associated with the generated connection specification, via the established connection.

7. The method of claim 5, further comprising the step of:

determining whether the generated connection specification is matched correctly with the at least one packet.

8. The method of claim 5, wherein the connection is allocated by a central coordinator using beacons indicating bandwidth allocation.

9. The method of claim 5, further comprising the step of:

reconfiguring the connection.

10. The method of claim 1, further comprising the step of:

if the at least one packet is not connection-oriented service worthy, releasing the at least one packet to connectionless service.

11. The method of claim 1, wherein the at least one packet is from a legacy application.

12. The method of claim 1, wherein the at least one packet is bridged from another network.

13. A device configured to be operably coupled to a network, the device comprising:

a classifier configured to:

match at least one packet with at least one rule in a set of classifier rules; and associate the at least one packet to one or more connections when the at least one packet matches with the at least one rule;

an auto-connect service module configured to:

if the at least one packet is not matched with the at least one rule in the set of classifier rules, examine the at least one packet;

release the at least one packet to connectionless traffic after the examination;

determine whether the at least one packet is connection-oriented service worthy; and a rule configurator module configured to:

if the at least one packet is determined connection-oriented service worthy, update, based on the at least one packet, at least one new classifier rule, the at least one new classifier rule comprising connection information and a set of one or more criteria.

14. The device of claim 13, wherein the auto-connect service module is further configured to determine whether the at least one packet is connection-oriented service worthy based on at least one of the following:
  one or more policies;
  one or more templates; and
  one or more heuristic algorithms.

15. The device of claim 13, wherein the at least one new classifier rule further comprises a rule priority.

16. The device of claim 13, wherein the network is a power line communication network.

17. The device of claim 13, wherein the auto-connect service module is further configured to:
  generate a connection specification for the at least one packet; and
  initiate a connection based on the generated connection specification.

18. The device of claim 17, wherein the auto-connect service module is further configured to:
  determine whether the generated connection specification is matched correctly with the at least one packet.

19. The device of claim 13, wherein the at least one packet is from a legacy application.

20. A system comprising:
  a first device comprising,
    a classifier configured to:
      match at least one packet with at least one rule in a set of classifier rules; and
      associate the at least one packet to one or more connections when the at least one packet matches with the at least one rule;
    an auto-connect service module configured to:
      if the at least one packet is not matched with the at least one rule in the set of classifier rules,
      examine the at least one packet;
      release the at least one packet to connectionless traffic after the examination;
      determine whether the at least one packet is connection-oriented service worthy;
        generate a connection specification for the at least one packet; and
        initiate a connection based on the generated connection specification; and
    a rule configurator module configured to:
      if the at least one packet is determined connection-oriented service worthy, update, based on the at least one packet, at least one new classifier rule, the at least one new classifier rule comprising connection information and a set of one or more criteria; and
  a second device adapted to receive packets via the initiated connection; and
  a network segment operably connecting the first device and the second device.

* * * * *